United States Patent
Noda (10) Patent No.: US 10,627,611 B2
(45) Date of Patent: Apr. 21, 2020

(54) LENS BARREL THAT PREVENTS UNDESIRED MOVEMENT OF OPTICAL UNITS, AND IMAGE PICKUP APPARATUS

(71) Applicant: CANON KABUSHIKI KAISHA, Tokyo (JP)

(72) Inventor: Atsuto Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 15/789,063

(22) Filed: Oct. 20, 2017

(65) Prior Publication Data

US 2018/0113287 A1    Apr. 26, 2018

(30) Foreign Application Priority Data

Oct. 26, 2016 (JP) ................. 2016-209540

(51) Int. Cl.
| | |
|---|---|
| G02B 15/20 | (2006.01) |
| G02B 7/10 | (2006.01) |
| G02B 7/02 | (2006.01) |
| H04N 5/225 | (2006.01) |
| G02B 5/04 | (2006.01) |

(52) U.S. Cl.
CPC .......... *G02B 15/20* (2013.01); *G02B 7/021* (2013.01); *G02B 7/10* (2013.01); *G02B 5/04* (2013.01); *H04N 5/2252* (2013.01); *H04N 5/2253* (2013.01); *H04N 5/2254* (2013.01); *H04N 5/2257* (2013.01)

(58) Field of Classification Search
CPC .......... G02B 15/20; G02B 7/021; G02B 7/10

USPC ......................................................... 359/696
See application file for complete search history.

(56) References Cited

U.S. PATENT DOCUMENTS

| | | | | |
|---|---|---|---|---|
| 10,302,899 B2 * | 5/2019 | Miyoshi | ................... | G02B 7/10 |
| 2002/0044771 A1 * | 4/2002 | Nakagawa | ............. | G03B 15/02 |
| | | | | 396/62 |

FOREIGN PATENT DOCUMENTS

JP    09-197491 A    7/1997

* cited by examiner

*Primary Examiner* — James R Greece
(74) *Attorney, Agent, or Firm* — Cowan, Liebowitz & Latman, P.C.

(57) ABSTRACT

A lens barrel which prevents an increase in driving force for optical units in a direction of an optical axis to downsize a power transmission mechanism, save power and also prevents undesired movement of the optical units even when they are urged by urging forces large enough to prevent rattling. The optical units move in the direction of the optical axis, and they are urged by urging member in the direction of the optical axis. A camshaft provided on outer peripheries of the optical units extends in the direction of the optical axis and is cam-engaged with each of the optical units. The power transmission mechanism transmits driving force, which is for rotating the camshaft, to the camshaft. A torque generated in the camshaft by the urging member urging one of the optical units and another torque generated in the camshaft by the urging member urging another one of the optical units are opposite in direction.

6 Claims, 12 Drawing Sheets

LENS BARREL THAT PREVENTS UNDESIRED MOVEMENT OF OPTICAL UNITS, AND IMAGE PICKUP APPARATUS

BACKGROUND OF THE INVENTION

Field of the Invention

The present invention relates to a zoom type lens barrel mounted in an image pickup apparatus such as a digital camera, and an image pickup apparatus that has the zoom type lens barrel.

Description of the Related Art

A zoom type lens barrel mounted in an image pickup apparatus such as a digital camera is equipped with a power transmission mechanism that moves lenses in a direction of an optical axis. As the power transmission mechanism, there has been proposed one which rotates a camshaft having cam surfaces to move lens holders, which are engaged with the camshaft, in the direction of the optical axis (Japanese Laid-Open Patent Publication (Kokai) No. H09-197491). According to this proposal, the lens holders are urged in the direction of the optical axis by an urging member such as a spring so as to be prevented from rattling. In this case, when the cam surface of the camshaft is sloped, a force component perpendicular to the optical axis as well as the urging force in the direction of the optical axis acts on the cam surfaces, and the force component is transmitted as torque, which is for rotating the camshaft, to the camshaft.

According to Japanese Laid-Open Patent Publication (Kokai) No. H09-197491, however, the two lens holders are urged in one direction along the optical axis by the single urging member. For this reason, a difference between torques is generated in the camshaft because of a difference in inclination angle and inclination direction of the cam surface, and this generates a remaining torque that rotates the camshaft in a predetermined direction.

To rotate the camshaft in a direction opposite to that of the remaining torque, the power transmission mechanism that rotates the camshaft needs to have driving force for rotating the camshaft against the remaining torque acting as driving resistance.

Namely, when the lens folders are urged by the urging forces large enough to prevent rattling of the lens holders, it is necessary to generate driving force equal to or larger than the remaining torque generated in the camshaft by the urging forces, which may upsize the power transmission mechanism and an increase a power consumption.

Moreover, depending on cam paths taken by the cam surfaces of the camshaft, the direction of the remaining torque is reversed according to a zoom position, and hence the camshaft moves by an amount corresponding to a backlash, causing undesired movement of the lens holders.

SUMMARY OF THE INVENTION

The present invention provides a technique to, even when optical units are urged by urging forces large enough to prevent rattling of the optical units, prevent an increase in driving force of the optical units in a direction of an optical axis to downsize a power transmission mechanism and save power, and also prevent undesired movement of the optical units.

Accordingly, the present invention provides a lens barrel comprising a first optical unit configured to move in a direction of an optical axis, a second optical unit configured to move in the direction of the optical axis, an urging member configured to urge the first optical unit and the second optical unit in the direction of the optical axis, a cam member provided on outer peripheries of the first optical unit and the second optical unit, the cam member being cam-engaged with each of the first optical unit and the second optical unit, and a power transmission mechanism configured to transmit driving force, which is for rotating the cam member, to the cam member, wherein the cam member is a camshaft that extends in the direction of the optical axis, and wherein a first torque generated in the camshaft by the urging member urging the first optical unit and a second torque generated in the camshaft by the urging member urging the second optical unit are opposite in direction.

According to the present invention, even when the optical units are urged by urging forces large enough to prevent rattling of the optical units, an increase in driving force of the optical units in the direction of the optical axis is prevented, to thereby downsize the power transmission mechanism and save power, and also undesired movement of the optical units is prevented.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
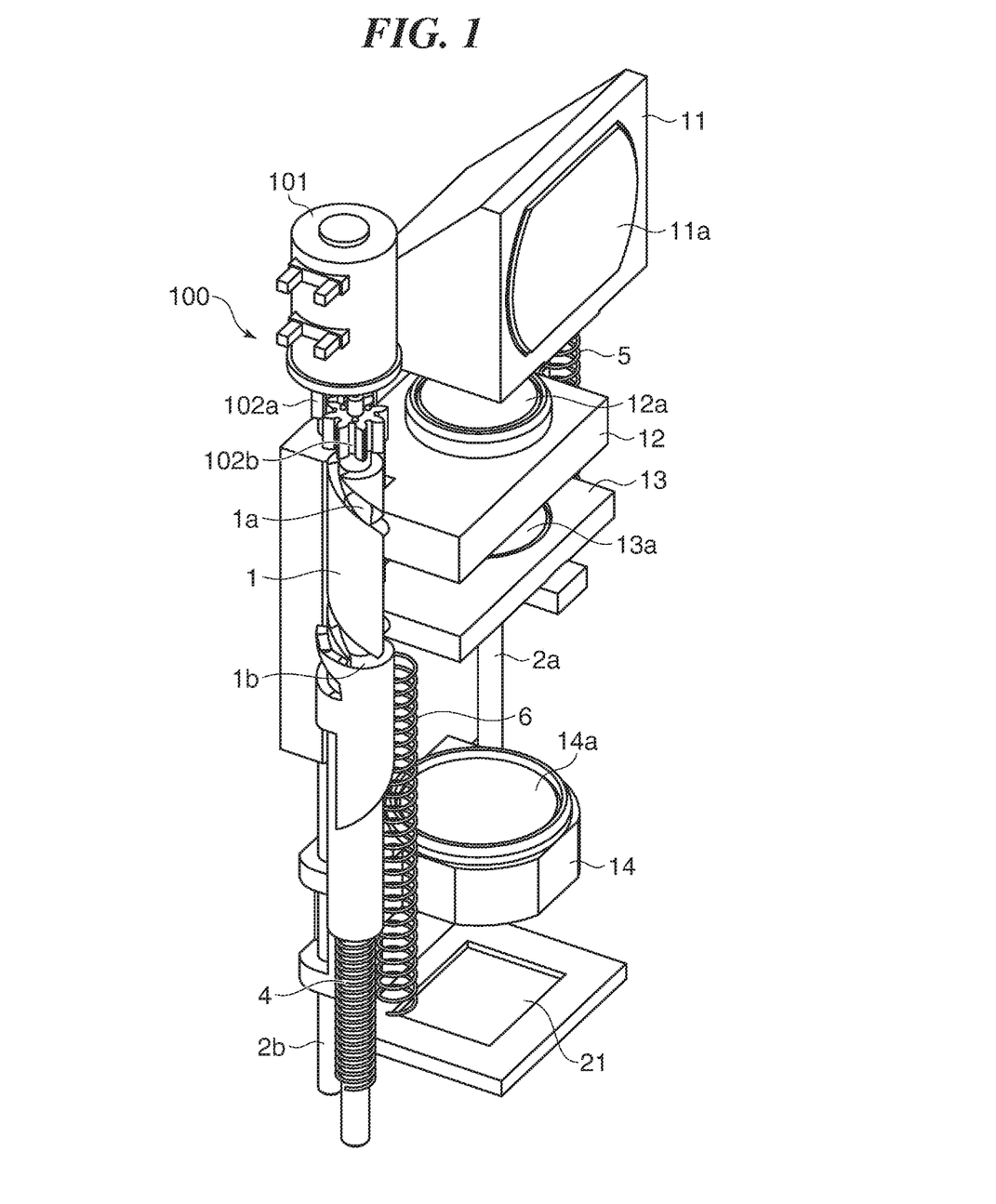
FIG. 1 is a perspective view showing an essential part of a lens barrel which is a first embodiment of the present invention.
Figure 2:
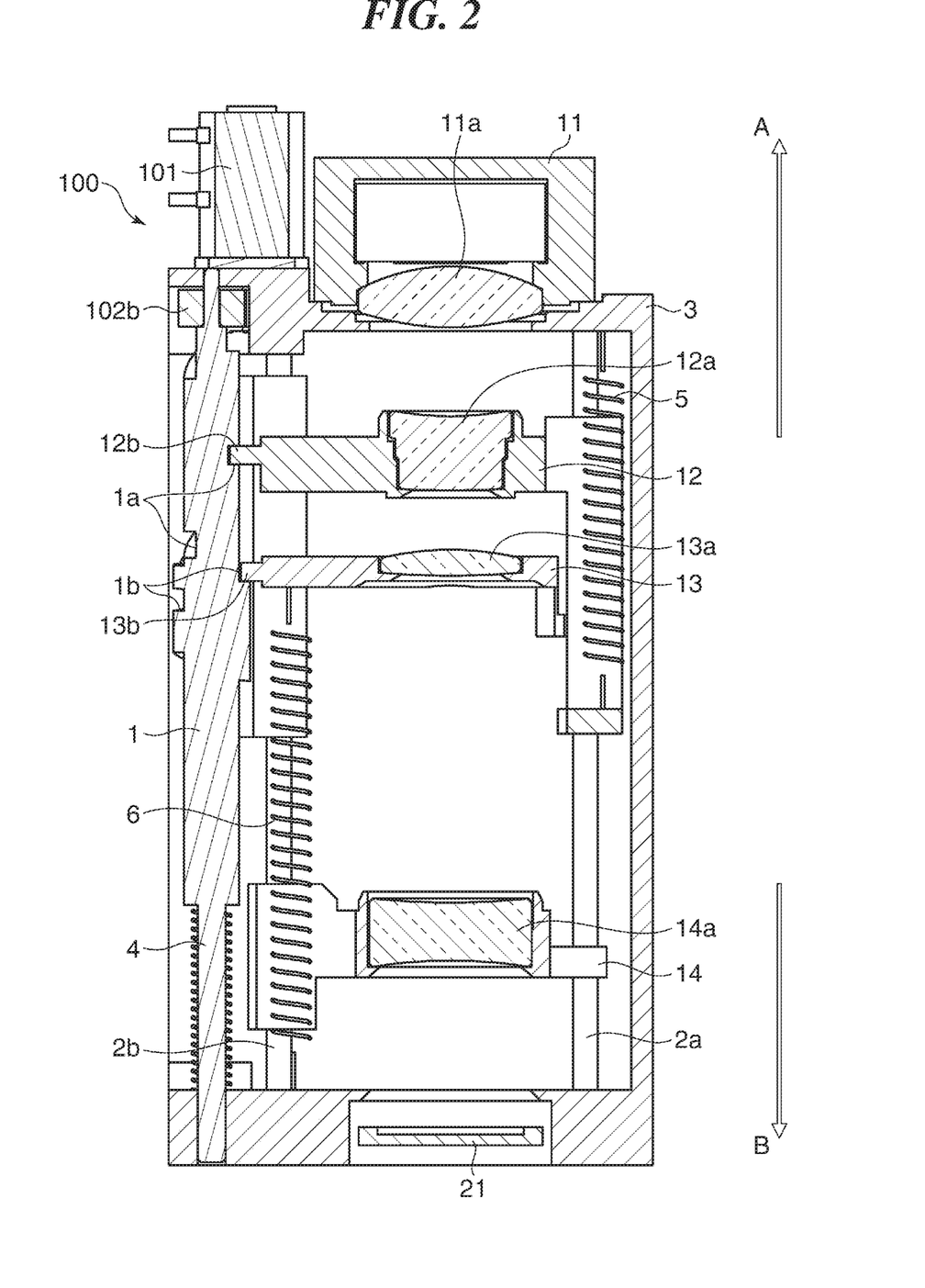
FIG. 2 is a cross-sectional view schematically showing a cross section, along direction of an optical axis, of the lens barrel at a location of a camshaft when the lens barrel is at a predetermined zoom position.

FIG. 1 is a perspective view showing an essential part of a lens barrel which is a first embodiment of the present invention. FIG. 2 is a cross-sectional view schematically showing a cross section, along direction of an optical axis, of the lens barrel at a location of a camshaft 1 when the lens barrel is at a predetermined zoom position. It should be noted that in the following description of the present embodiment, the lens barrel provided in a digital camera, which is an example of an image pickup apparatus, or the like is taken as an example.

As shown in FIGS. 1 and 2, the lens barrel according to the present embodiment has a first optical unit 11, and a plurality of optical units including a second optical unit 12, a third optical unit 13, and a fourth optical unit 14, each of which is movable in a direction of an optical axis, a camshaft 1, guide bars 2a and 2b, and a housing case 3. The camshaft 1 has a first cam portion 1a formed at a distance of a radius R1 from a center of the camshaft 1, and a second cam portion 1b formed at a distance of a radius R2 from the center of the camshaft 1. The lens barrel changes shooting magnifications by the optical units 12 to 14 moved in the direction of the optical axis. The camshaft 1 corresponds to an example of a cam member according to the present invention.

The camshaft 1 and the guide bars 2a and 2b are each arranged parallel to the optical axis. The camshaft 1 is rotatably supported by the housing case 3 and urged toward a subject side in the direction of the optical axis by a first spring member 4 which is a compression spring provided as an urging member. The guide bars 2a and 2b are fixed to the housing case 3.

The first optical unit 11 holds a first lens group 11a and is fixed to the housing case 3. The first lens group 11a has two lenses provided perpendicularly to each other, and a prism (not shown) is provided between the two lenses. It should be noted that in the present embodiment, the first optical unit 11 is a fixed optical group, but may be a movable optical group. The prism should not necessarily be included in the first lens group 11a, but may be provided in a lens group of another optical unit on an image plane side.

The second optical unit 12 holds a second lens group 12a and is held by the guide bars 2a and 2b movably in the direction of the optical axis. The second optical unit 12 has a first follower 12b which engages with the first cam portion 1a provided in the camshaft 1. One end of a second spring member 5 provided as an urging member is fixed to the second optical unit 12. The other end of the second spring member 5 is fixed to an upper surface of the housing case 3. The second spring member 5, which is a tension spring, urges the second optical unit 12 toward the subject side in the direction of the optical axis (in a direction indicated by an arrow A).

The third optical unit 13 holds a third lens group 13a and is held by the guide bars 2a and 2b movably in the direction of the optical axis. The third optical unit 13 has a second follower 13b which engages with the second cam portion 1b provided in the camshaft 1. One end of a third spring member 6 provided as an urging member is fixed to the third optical unit 13. The other end of the third spring member 6 is fixed to a lower surface of the housing case 3. The third spring member 6, which is a tension spring, urges the third optical unit 13 toward the image plane side in the direction of the optical axis (in a direction indicated by an arrow B).

The fourth optical unit 14 holds a fourth lens group 14a, which constitutes a focus lens, and is held by the guide bars 2a and 2b movably in the direction of the optical axis. The fourth optical unit 14 is independently actuated in the direction of the optical axis by an actuator (not shown) to perform focusing.

An image pickup device 21 is arranged on the image plane side of the fourth optical unit 14 and fixed to the housing case 3. The image pickup device 21 photoelectrically converts a subject image, which is formed through the first lens group 11a, the second lens group 12a, the third lens group 13a, and the fourth lens group 14a, into an electric signal and outputs the electric signal to an image processing unit (not shown).

A description will now be given of how the lens barrel arranged as described above works. A power transmission mechanism 100 has a stepping motor 101, gears 102a and 102b, and so forth. Power of the stepping motor 101 is transmitted to the camshaft 1 through engagement of the gears 102a and 102b, causing the camshaft 1 to rotate. The camshaft 1 is engaged with the first follower 12b of the second optical unit 12 by the first cam portion 1a and engaged with the second follower 13b of the third optical unit 13 by the second cam portion 1b.

Therefore, with rotation of the camshaft 1, a cam action of the first cam portion 1a and the first follower 12b, and a cam action of the second cam portion 1b and the second follower 13b cause the second optical unit 12 and the third optical unit 13 to move in the direction of the optical axis. The lens barrel thus performs a zooming operation.

Next, referring to FIGS. 3 and 4A to 4C, a description will be given of torque required to rotate the camshaft 1 when the zooming operation of the lens barrel is performed.

Figure 3:
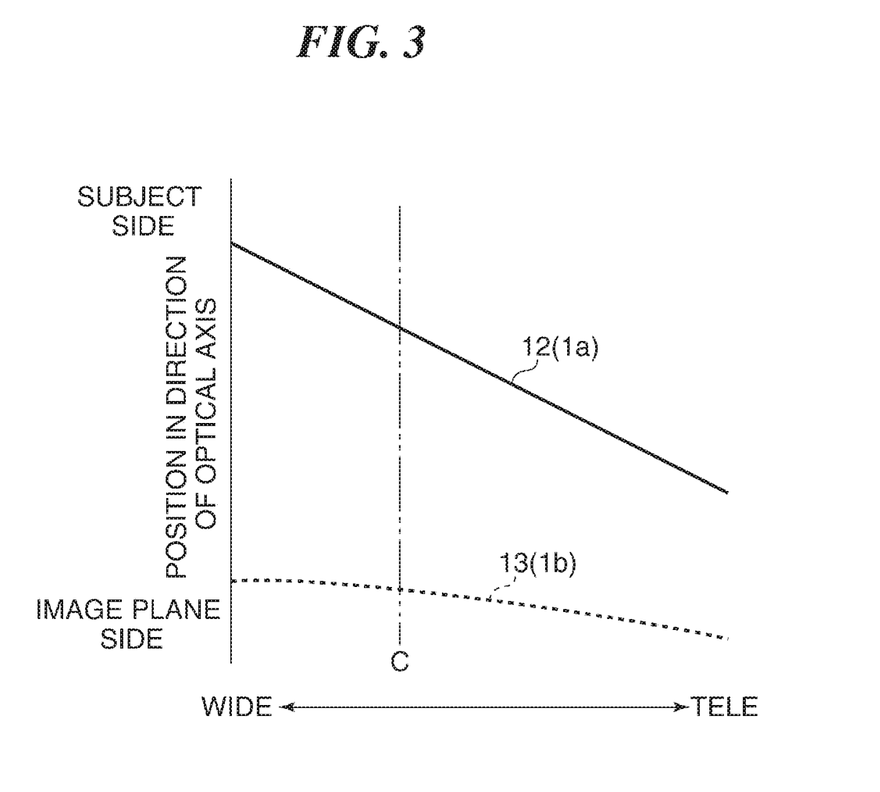
FIG. 3 is a graph showing a positional relationship between a second optical unit and a third optical unit in a direction of an optical axis from a wide-angle position to a telephoto position.

FIG. 3 is a graph showing a positional relationship between the second optical unit 12 and the third optical unit 13 in the direction of the optical axis between a wide-angle (WIDE) position and a telephoto (TELE) position. It should be noted that in FIG. 3, the left-hand side of the horizontal axis is the wide-angle position, and the right-hand side of the horizontal axis is the telephoto position. The upper side of the vertical axis is the subject side, and the lower side of the vertical axis is the image plane side.

Figure 4A:
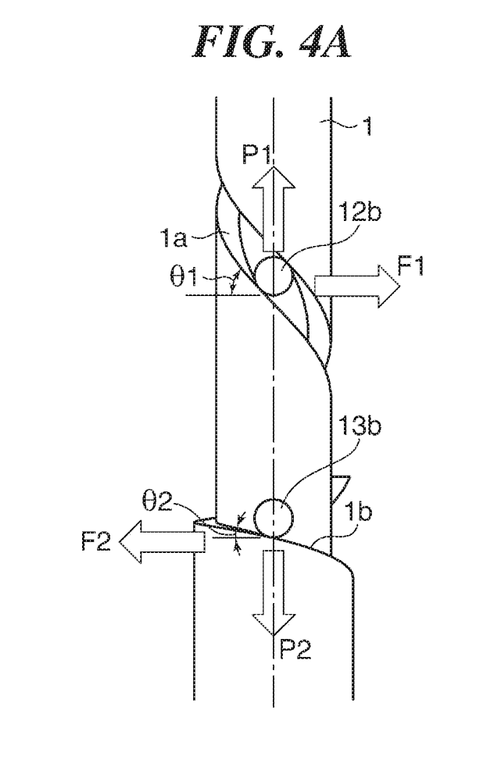
FIGS. 4A to 4C are conceptual diagrams explaining directions of urging forces applied to the second optical unit and the third optical unit at a predetermined zoom position, and directions of torques generated in the camshaft by the urging forces.
Figure 4B:
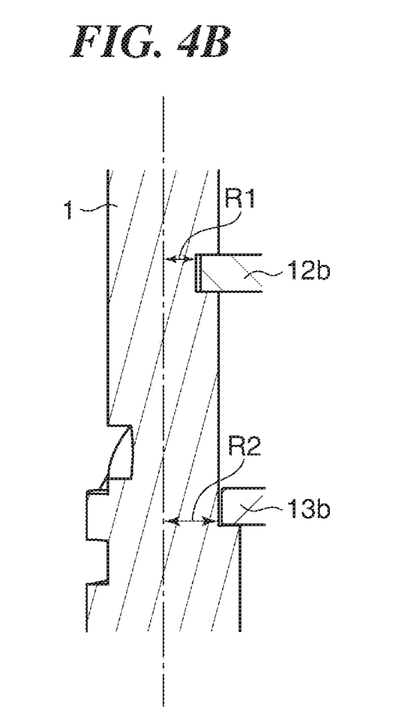
Figure 4C:
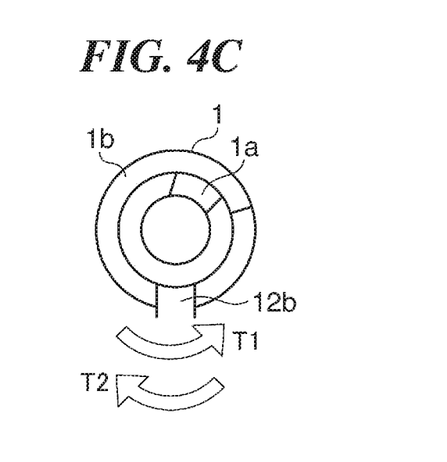

FIGS. 4A to 4C are conceptual diagrams explaining directions of urging forces applied to the second optical unit 12 and the third optical unit 13 at a zoom position C shown in FIG. 3, and directions of torques generated in the camshaft 1 by the urging forces. FIG. 4A shows the camshaft 1 as seen from a radial direction, FIG. 4B is a cross-sectional view showing the camshaft 1 taken along an axis thereof, and FIG. 4C is a view showing the camshaft 1 as seen from the subject side in an axial direction thereof.

As shown in FIG. 3, the second optical unit 12 moves, starting from the wide-angle position toward the telephoto position, in one direction from the subject side to the image plane side. The third optical unit 13 moves in one direction, starting from the wide-angle position toward the telephoto position, that is, in the same direction as the direction in which the second optical unit 12 moves from the subject side to the image plane side, wherein the third optical unit 13 always moves from the subject side to the image plane side at a gentler inclination than that of the second optical unit 12.

As shown in FIGS. 3 and 4A, at the zoom position C, the first cam portion 1a has an inclination angle θ1 in such a direction as to incline downward to the right, and the second cam portion 1b has an inclination angle θ2 in such a direction as to incline downward to the right. The inclination angle θ1 is larger than the inclination angle θ2 (θ1>θ2). As shown in FIG. 4A, the second optical unit 12 is urged toward the subject side in the direction of the optical axis by the second spring member 5 with an urging force P1, and the first cam portion 1a is inclined at the inclination angle θ1 with respect to an axis perpendicular to the optical axis.

For this reason, a force F1=P1×tan θ1 acts on the camshaft 1 in a direction perpendicular to the optical axis. The camshaft 1 is rotatably supported by the housing case 3. The first cam portion 1a is formed at the distance of the radius R1 from the center of the camshaft 1; accordingly, a torque T1=R1×F1 acts on the camshaft 1 counterclockwise as seen from the subject side.

Likewise, the third optical unit 13 is urged toward the subject side in the direction of the optical axis by the third spring member 6 with an urging force P2, and the second cam portion 1b is inclined at the inclination angle θ2 with respect to an axis perpendicular to the optical axis.

For this reason, a force F2=P2×tan θ2 acts on the camshaft 1 in a direction perpendicular to the optical axis. The camshaft 1 is rotatably supported by the housing case 3. The second cam portion 1b is formed at the distance of the radius R2 from the center of the camshaft 1; accordingly, a torque T2=R2×F2 acts on the camshaft 1 clockwise as seen from the subject side.

As described above, in the present embodiment, the first cam portion 1a and the second cam portion 1b are inclined in one direction, and their inclination angles always have the relationship θ1>θ2. This relationship is established at all zoom positions. The directions of the urging forces P1 and P2 are determined so that torques generated in the first cam portion 1a and the second cam portion 1b are always opposite in direction.

Namely, the torque generated in the camshaft 1 is reduced by adjusting the direction in which the second spring member 5 urges the second optical unit 12 and the direction in which the third spring member 6 urges the third optical unit 13 so that torques generated in the first cam portion 1a and the second cam portion 1b are always opposite in direction. This reduces the torque required for the power transmission mechanism 100 to drive the camshaft 1; however, a remaining torque T=T1−T2, which is a difference between the torque T1 generated by the urging force P1 and the torque T2 generated by the urging force P2, remains in the camshaft 1. Thus, in the present embodiment, the remaining torque T is reduced by adjusting the magnitudes of the urging forces P1 and P2 to make the torques T1 and T2 substantially equal (T1≈T2), which further reduces the torque required for the power transmission mechanism 100 to drive the camshaft 1.

For example, in the present embodiment, the urging forces P1 and P2 are determined so that the following relationship is established: P2≈(P1×R1×tan θ1)/(R2×tan θ2). This generates a small remaining torque in a stable manner in one direction at all times irrespective of cam paths taken by the first cam portion 1a and the second cam portion 1b, which prevents undesired movements of the second optical unit 12 and the third optical unit 13.

It should be noted that actually, the inclination angles θ1 and η2 and the urging forces P1 and P2 vary with zoom positions, and hence when R1×tan θ1>R2×tan θ2 is established, the urging forces P1 and P2 should be determined so that P1<P2 is established. In this case, if the urging force P2 is excessively large, an excessive force would acts on the third optical unit 13, causing the third optical unit 13 to incline, which brings about degradation in optical performance and increase in frictional resistance. For this reason, in the present embodiment, the first cam portion 1a and the second cam portion 1b are differentiated in diameter (R1<R2) to prevent the urging force P2 from being excessively large.

The magnitude relationship between the torques T1 and T2 is reversed depending on zoom positions. Namely, if there is a position at which the direction of the remaining torque is reversed, there is a fear of image wobbling or the like. It is thus preferred to construct so that the relationship T1>T2 or T1<T2 is always established at any zoom position. It should be noted that in the present embodiment, the camshaft 1 may have a diameter equal to, larger, or smaller than that of the second optical unit 12 and that of the third optical unit 13.

As described above, even when the first and second optical units 12 and 13 are urged with urging forces large enough to prevent the first and second optical units 12 and 13 from rattling, an increase in driving force for the optical units 12 and 13 in the direction of the optical axis is prevented, to thereby downsize the power transmission mechanism 100 and save power. Moreover, in the present embodiment, since a small remaining torque is stably generated in one direction at all times irrespective of cam paths taken by the first cam portion 1a and the second cam portion 1b, which prevents undesired movements of the second optical unit 12 and the third optical unit 13.

Next, referring to FIGS. 5 to 10C, a description will be given of a lens barrel that is a second embodiment of the present invention. It should be noted that in the following description of the present embodiment, components corresponding to those of the first embodiment are described by denoting them using the same reference numerals.

Figure 5:
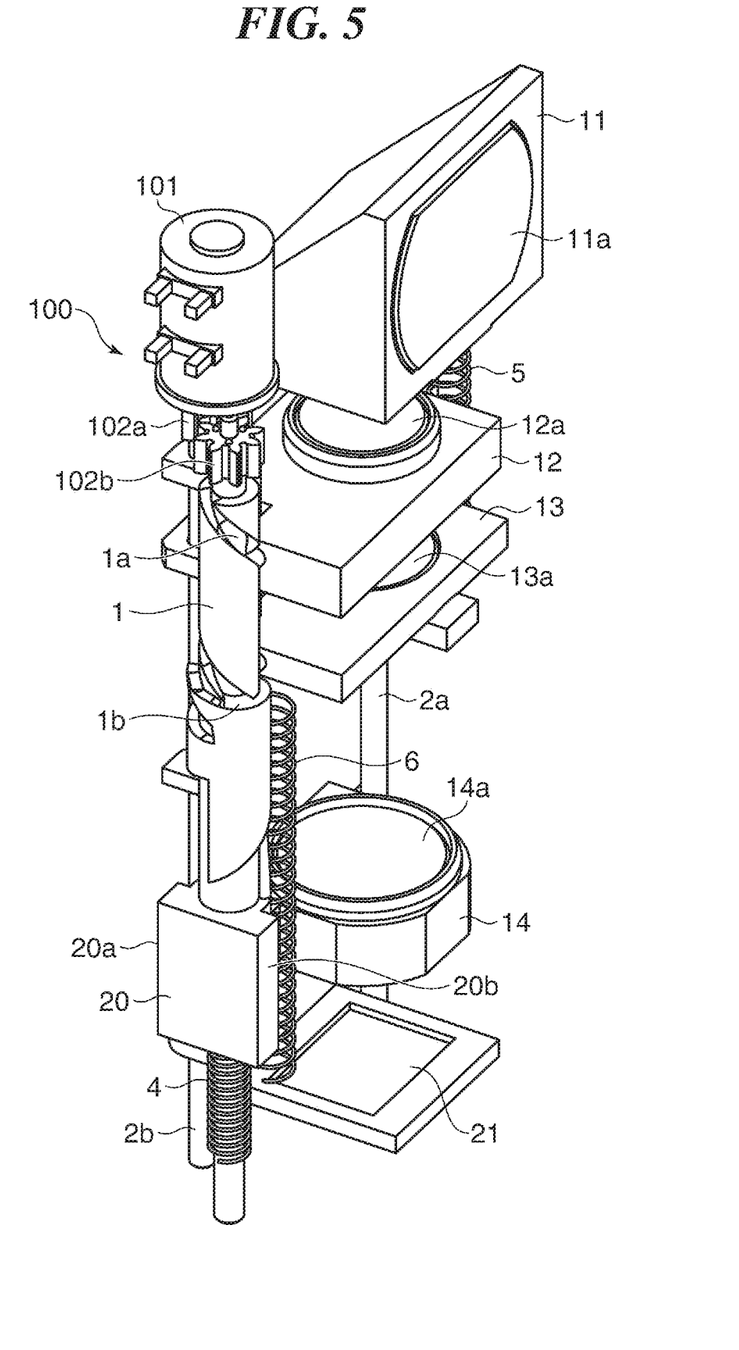
FIG. 5 is a perspective view showing an essential part of a lens barrel which is a second embodiment of the present invention as seen from a camshaft side.
Figure 6:
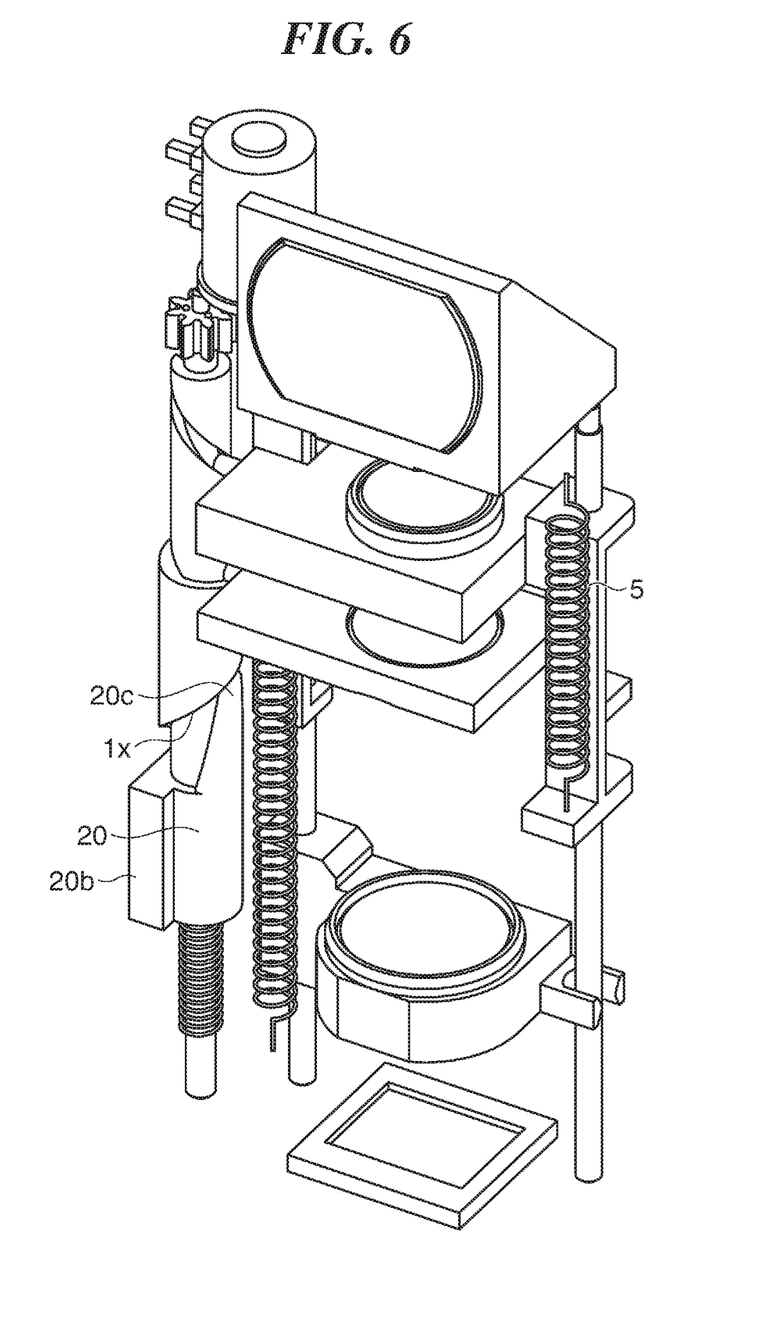
FIG. 6 is a perspective view showing the essential part of the lens barrel in FIG. 5 as seen from a second spring member side.
Figure 7:
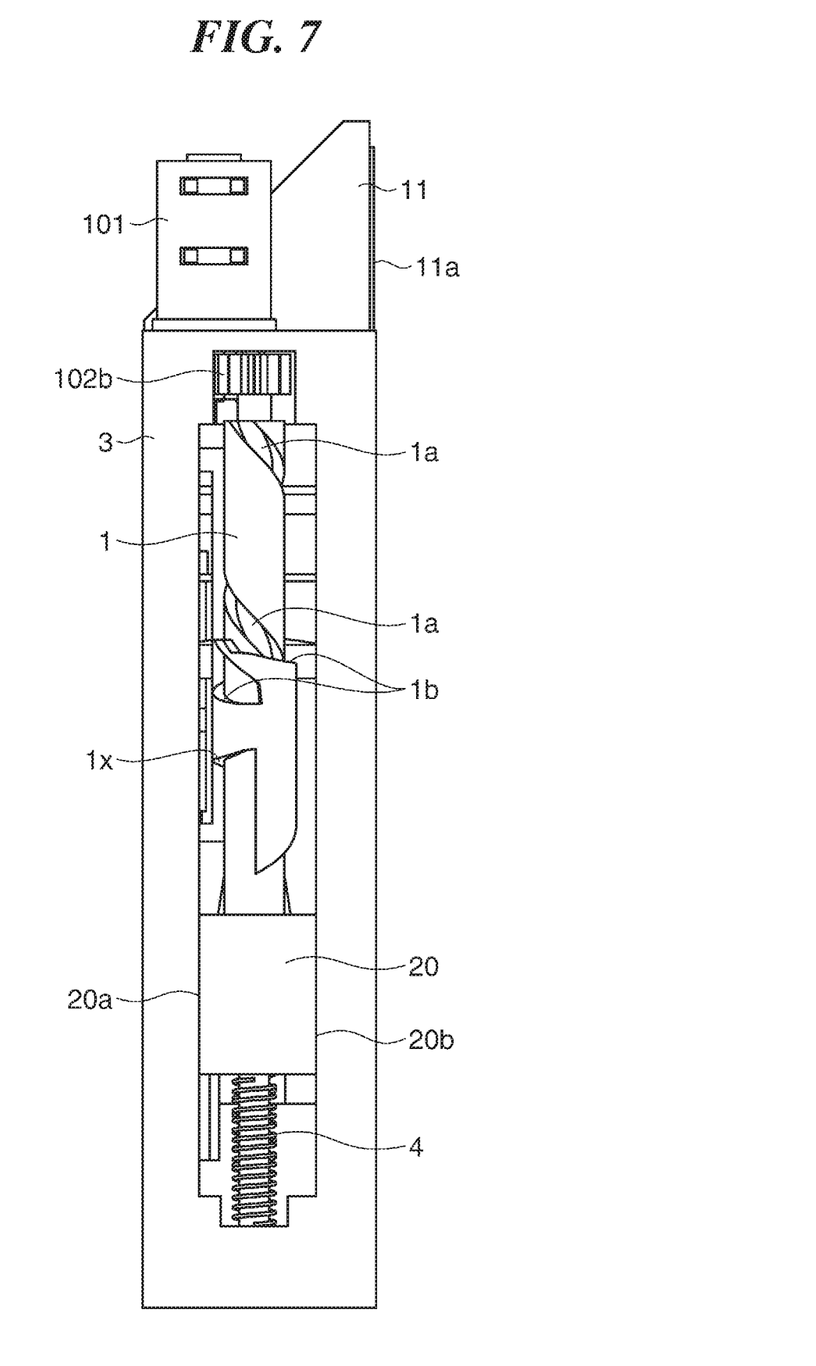
FIG. 7 is a side view showing the lens barrel.
Figure 8:
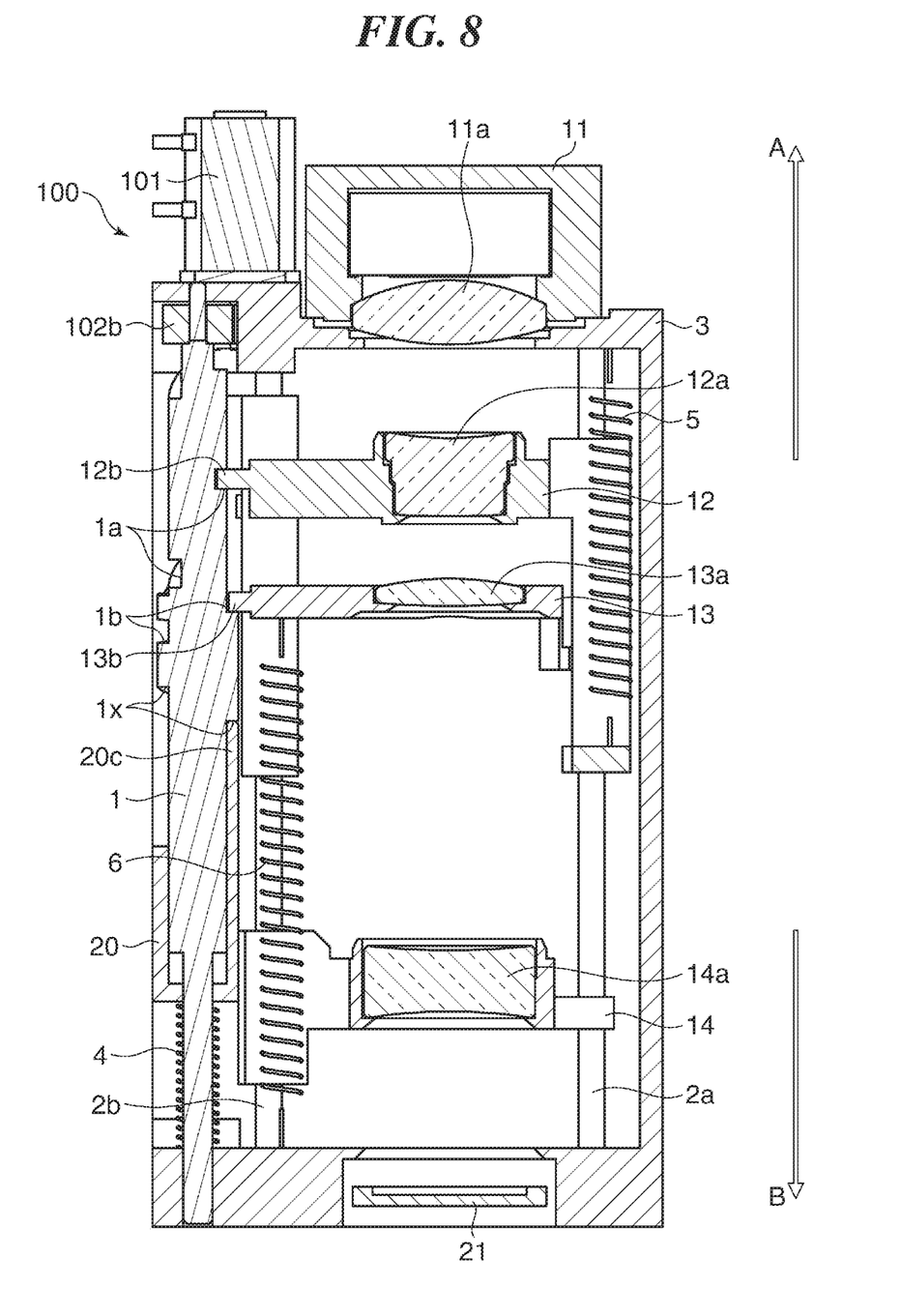
FIG. 8 is a cross-sectional view schematically showing a cross section, along direction of an optical axis, of the lens barrel at a location of a camshaft when the lens barrel is at a predetermined zoom position.

FIG. 5 is a perspective view showing an essential part of the lens barrel as seen from the camshaft 1 side. FIG. 6 is a perspective view showing the essential part of the lens barrel as seen from a second spring member 5 side. FIG. 7 is a side view showing the lens barrel. FIG. 8 is a cross-sectional view schematically showing a cross section, along direction of an optical axis, of the lens barrel at a location of a camshaft 1 when the lens barrel is at a predetermined zoom position.

As shown in FIGS. 5 to 8, the lens barrel according to the present embodiment has a first optical unit 11, and a plurality of optical units including a second optical unit 12, a third optical unit 13, and a fourth optical unit 14, each of which is movable in the direction of the optical axis, the camshaft 1, guide bars 2a and 2b, and a housing case 3. The camshaft 1 has a first cam portion 1a formed at a distance of a radius R1 from a center of the camshaft 1, a second cam portion 1b formed at a distance of a radius R2 from the center of the camshaft 1, and an adjustment cam portion 1x formed at a distance of a radius Rx from the center of the camshaft 1. The camshaft 1 and the guide bars 2a and 2b are each arranged parallel to the optical axis. The camshaft 1 is rotatably supported by the housing case 3.

In the present embodiment, a torque adjustment member 20 is provided on the image plane side of the camshaft 1. The torque adjustment member 20 is coaxially inserted around the camshaft 1 movably in the direction of the optical axis relative to the camshaft 1. The torque adjustment member 20 has wall portions 20a and 20b which have surfaces parallel to the optical axis, and rotation of the torque adjustment member 20 is restrained by fitting the wall portions 20a and 20b into the housing case 3. The torque adjustment member 20 has an engagement pin 20c extended therefrom in the direction of the optical axis. The engagement pin 20c is cam-engaged with the adjustment cam portion 1x formed on the camshaft 1.

The torque adjustment member 20, as well as the camshaft 1, is urged by a first spring member 4, which is a compression spring provided as an urging member on the image plane side, toward the subject side in the direction of the optical axis. Thus, as the camshaft 1 rotates, a cam action of the adjustment cam portion 1x and the engagement pin 20c causes the torque adjustment member 20 to move in the direction of the optical axis while being restrained from rotating.

The first optical unit 11 holds a first lens group 11a and is fixed to the housing case 3. The first lens group 11a has two lenses provided perpendicularly to each other, and a prism (not shown) is provided between the two lenses. It should be noted that in the present embodiment, the first optical unit 11 is a fixed optical group, but may be a moving optical group. The prism should not necessarily be included in the first lens group 11a, but may be provided in a lens group of another optical unit on the image plane side.

The second optical unit 12 holds a second lens group 12a and is held by the guide bars 2a and 2b movably in the direction of the optical axis. The second optical unit 12 has a first follower 12b which engages with the first cam portion 1a provided in the camshaft 1. One end of a second spring member 5 provided as an urging member is fixed to the second optical unit 12. The other end of the second spring member 5 is fixed to an upper surface of the housing case 3. The second spring member 5, which is a tension spring, urges the second optical unit 12 toward the subject side in the direction of the optical axis.

The third optical unit 13 holds a third lens group 13a and is held by the guide bars 2a and 2b movably in the direction of the optical axis. The third optical unit 13 has a second follower 13b which engages with the second cam portion 1b provided in the camshaft 1. One end of a third spring member 6 provided as an urging member is fixed to the third optical unit 13. The other end of the third spring member 6 is fixed to a lower surface of the housing case 3. The third spring member 6, which is a tension spring, urges the third optical unit 13 toward the image plane side in the direction of the optical axis.

The fourth optical unit 14 holds a fourth lens group 14a, which constitutes a focus lens, and is held by the guide bars 2a and 2b movably in the direction of the optical axis. The fourth optical unit 14 is independently actuated in the direction of the optical axis by an actuator (not shown) to perform focusing.

An image pickup device 21 is arranged on the image plane side of the fourth optical unit 14 and fixed to the housing case 3. The image pickup device 21 photoelectrically converts a subject image, which is formed through the first lens group 11a, the second lens group 12a, the third lens group 13a, and the fourth lens group 14a, into an electric signal and outputs the electric signal to an image processing unit (not shown).

Next, referring to FIGS. 9 and 10A to 10C, a description will be given of torque required to rotate the camshaft 1 when the zooming operation of the lens barrel is performed.

Figure 9:
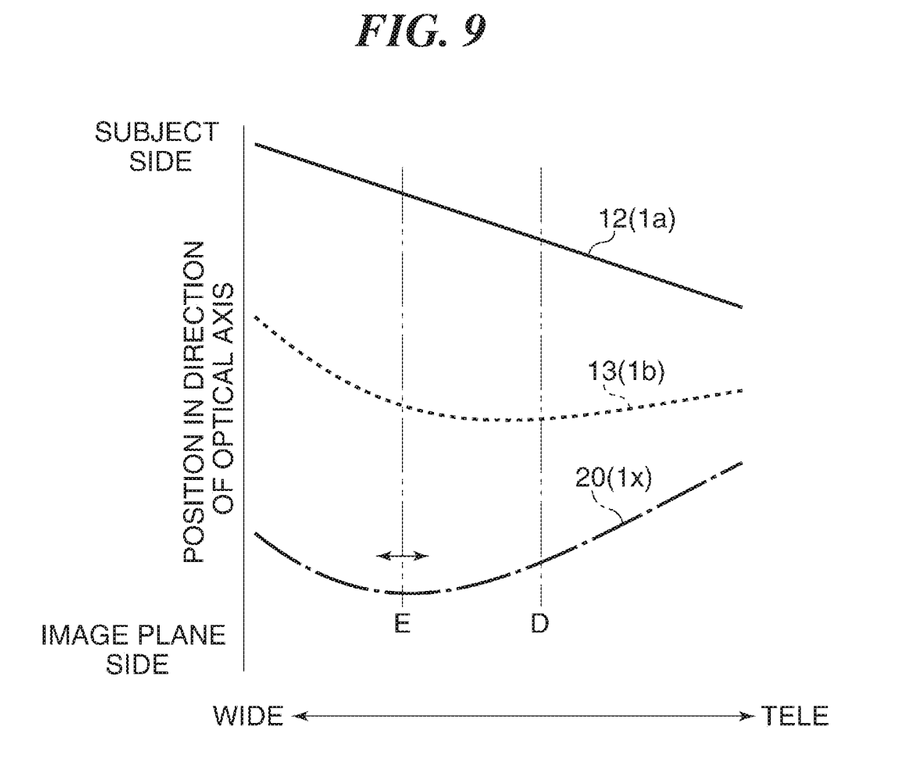
FIG. 9 is a graph showing a positional relationship among a second optical unit, a third optical unit, and a torque adjustment member in the direction of the optical axis from a wide-angle position to a telephoto position.

FIG. 9 is a graph showing a positional relationship among the second optical unit 12, the third optical unit 13, and the torque adjustment member 20 in the direction of the optical axis between a wide-angle (WIDE) position and a telephoto (TELE) position. It should be noted that in FIG. 9, the left-hand side of the horizontal axis is the wide-angle position, and the right-hand side of the horizontal axis is the telephoto position. The upper side of the vertical axis is the subject side, and the lower side of the vertical axis is the image plane side.

Figure 10A:
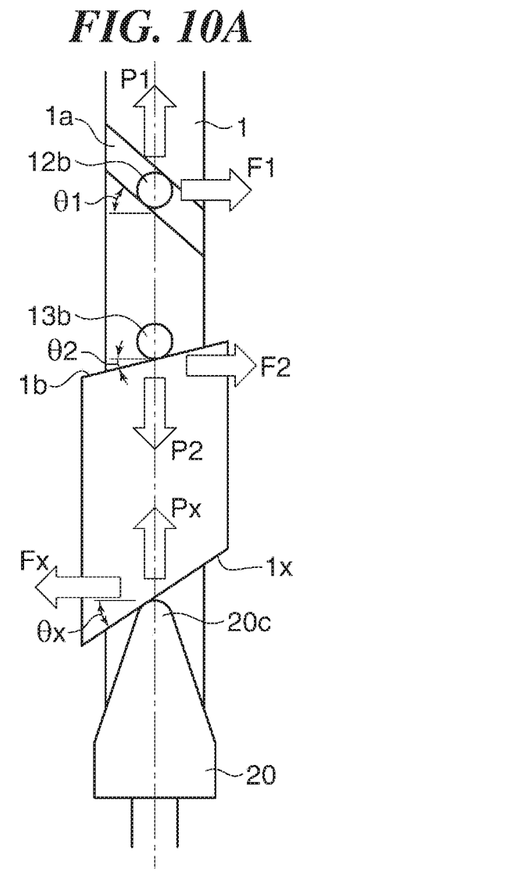
FIGS. 10A to 10C are conceptual diagrams explaining directions of urging forces applied to the second optical unit, the third optical unit, and the torque adjustment member, at a predetermined zoom position, and directions of torques generated in the camshaft by the urging forces.
Figure 10B:
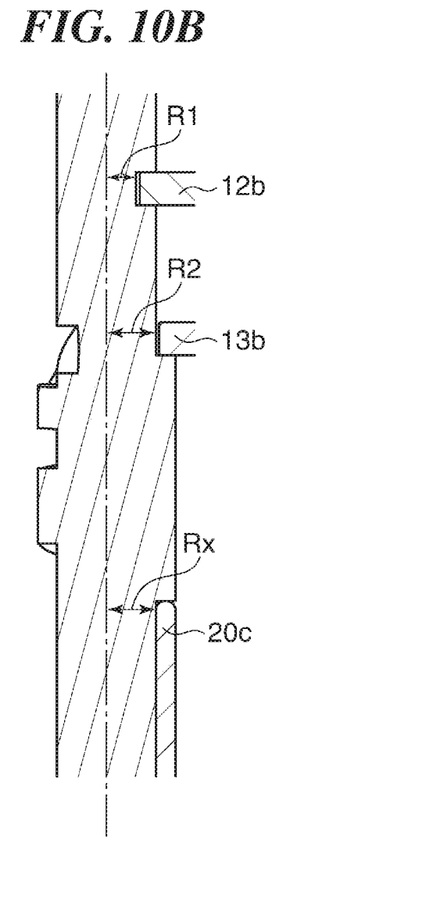
Figure 10C:
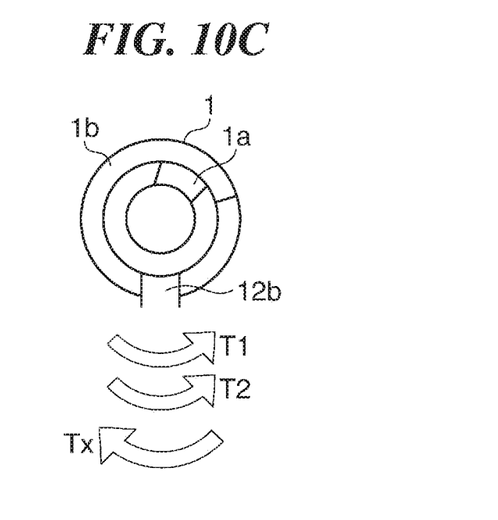

FIGS. 10A to 10C are conceptual diagrams explaining directions of urging forces applied to the second optical unit 12, the third optical unit 13, and the torque adjustment member 20 at a zoom position D shown in FIG. 9, and directions of torques generated in the camshaft 1 by the urging forces. FIG. 10A shows the camshaft 1 as seen from the radial direction, FIG. 10B is a cross-sectional view showing the camshaft 1 taken along an axis thereof, and FIG. 10C is a view showing the camshaft 1 as seen from the subject side in an axial direction thereof.

As shown in FIG. 9, the second optical unit 12 moves, starting from the wide-angle position toward the telephoto position, in one direction from the subject side to the image plane side. The third optical unit 13 follows a cam path taken by the first cam portion 1a to move in the direction of the optical axis from the wide-angle position toward the telephoto position.

As shown in FIGS. 9 and 10A, at the zoom position D, the first cam portion 1a has an inclination angle $\theta 1$ in such a direction as to incline downward to the right, and the second cam portion 1b has an inclination angle $\theta 2$ in such a direction as to incline upward to the right. As shown in FIG. 10A, the second optical unit 12 is urged toward the subject side in the direction of the optical axis by the second spring member 5 with an urging force P1, and the first cam portion 1a is inclined at the inclination angle $\theta 1$ with respect to an axis perpendicular to the optical axis.

For this reason, a force $F1=P1 \times \tan \theta 1$ acts on the camshaft 1 in a direction perpendicular to the optical axis. The camshaft 1 is rotatably supported by the housing case 3. The first cam portion 1a is formed at the distance of the radius R1 from the center of the camshaft 1; accordingly, a torque $T1=R1 \times F1$ acts on the camshaft 1 counterclockwise as seen from the subject side.

Likewise, the third optical unit 13 is urged toward the subject side in the direction of the optical axis by the third spring member 6 with an urging force P2, and the second cam portion 1b is inclined at the inclination angle $\theta 2$ with respect to an axis perpendicular to the optical axis.

For this reason, a force $F2=P2 \times \tan \theta 2$ acts on the camshaft 1 in a direction perpendicular to the optical axis. The camshaft 1 is rotatably supported by the housing case 3. The second cam portion 1b is formed at the distance of the radius R2 from the center of the camshaft 1; accordingly, a torque $T2=R2 \times F2$ acts on the camshaft 1 counterclockwise as seen from the subject side.

As described above, in the present embodiment, by urging the second optical unit 12 toward the subject side in the direction of the optical axis by the second spring member 5 and urging the third optical unit 13 toward the image plane side in the direction of the optical axis by the third spring member 6, a torque $T1=T1+T2$ which acts counterclockwise on the camshaft 1 is generated.

At the zoom position D, the adjustment cam portion 1x is inclined upward to the right at an inclination angle $\theta x$. As shown in FIG. 10A, the torque adjustment member 20 is urged toward the subject side in the direction of the optical axis by the first spring member 4 with an urging force Px, and the adjustment cam portion 1x is inclined at the inclination angle θx with respect to an axis perpendicular to the optical axis.

For this reason, a force Fx=Px×tan θx acts on the camshaft 1 in a direction perpendicular to the optical axis. The camshaft 1 is rotatably supported by the housing case 3. The adjustment cam portion 1x is formed at the distance of the radius Rx from the center of the camshaft 1; accordingly, a torque Tx=Rx×Fx acts on the camshaft 1 clockwise as seen from the subject side.

In this case, it is possible to adjust the urging force Px of the first spring member 4 and the inclination angle θx of the adjustment cam portion 1x so that the following relationship is established: Tx≈T1+T2. This means that it is possible to adjust the torque Tx irrespective of the shapes of the first cam portion 1a and the second cam portion 1b and zoom positions.

Remaining torque generated, at a predetermined position, in the camshaft 1 by urging the second optical unit 12 and the third optical unit 13 is uniquely determined. Thus, the torque Tx is adjusted by adjusting the inclination angle θx at each zoom position of the adjustment cam portion 1x and/or the urging force Px of the first spring member 4, and as a result, the torque (T1+T2), which is generated by urging the second optical unit 12 and the third optical unit 13, is cancelled by the torque Tx.

For example, on the wide-angle side relative to a zoom position E shown in FIG. 9, the torque T1 which acts counterclockwise and the torque T2 which acts clockwise are generated. When T1<T2, a remaining torque T2−T1 acts clockwise on the camshaft 1. Then, on the telephoto side relative to the zoom position E, when it gets T1>T2, the direction of the remaining torque is reversed, and hence a remaining torque T1−T2 acts counterclockwise on the camshaft 1.

In this case, by reversing the direction in which the adjustment cam portion 1x is inclined, not only the magnitude of the torque Tx but also the direction of the torque Tx is adjusted. Therefore, it is possible to keep adjusting the remaining torque on the camshaft 1, which includes the torque T2 for the adjustment, to be minimum, while handling the reversal of the direction of the remaining torque.

In the present embodiment, the number of optical units moved in the direction of the optical axis by the cam portions of the camshaft 1 is set as two, but can be set as three or more. In this case, torques generated in the camshaft 1 by urging the optical units should be subjected to summation when the torques are in the same direction or subjected to subtraction when the torques are in different directions, and the inclination angle θx and the urging force Px should be adjusted so as to cancel a sum of the torques Tsum to generate a torque Tx which has the direction opposite to that of the torque Tsum and establishes the relationship Tx≈Tsum.

For example, when torques generated in the camshaft 1 by urging the optical units which are cam-engaged with the camshaft 1 are a torque T1 acting clockwise, a torque T2 acting counterclockwise, a torque T3 acting clockwise, . . . , the sum of the torques Tsum is the following torque acting clockwise: T1−T2+T3. In this case, the inclination angle θx and the urging force Px should be adjusted so that the torque Tsum acts counterclockwise and establishes the relationship Tsum≈Tx.

Moreover, if there is a position at which the magnitude relationship between the sum of torques Tsum, which are generated in the camshaft 1 by urging the two or more optical units, and the torque Tx is reversed, there is a fear of image wobbling or the like. It is thus preferred to construct so that the relationship Tsum>Tx or Tsum<Tx is always established at any zoom position. The camshaft 1 may have a diameter equal to, larger, or smaller than that of the second optical unit 12 and that of the third optical unit 13.

As described above, in the present embodiment, by using the torque adjustment member 20, it is possible to keep the remaining torque to be minimum and maintain the direction of the remaining torque uniform, irrespective of types of cam paths taken by the cam portions of the camshaft 20 and the number of optical units engaged with the cam portions. Other arrangements and operational advantages are the same as those in the above described first embodiment.

Next, referring to FIGS. 11 and 12, a description will be given of a lens barrel that is a third embodiment of the present invention. It should be noted that in the following description of the present embodiment, components corresponding to those of the first embodiment are described by denoting them using the same reference numerals.

In the first and second embodiments described above, the stepping motor 101 is used for the power transmission mechanism 100 to transmit driving force to the camshaft 1, meanwhile in the present embodiment, a linear actuator 103 is used to transmit driving force to the camshaft 1.

Figure 11:
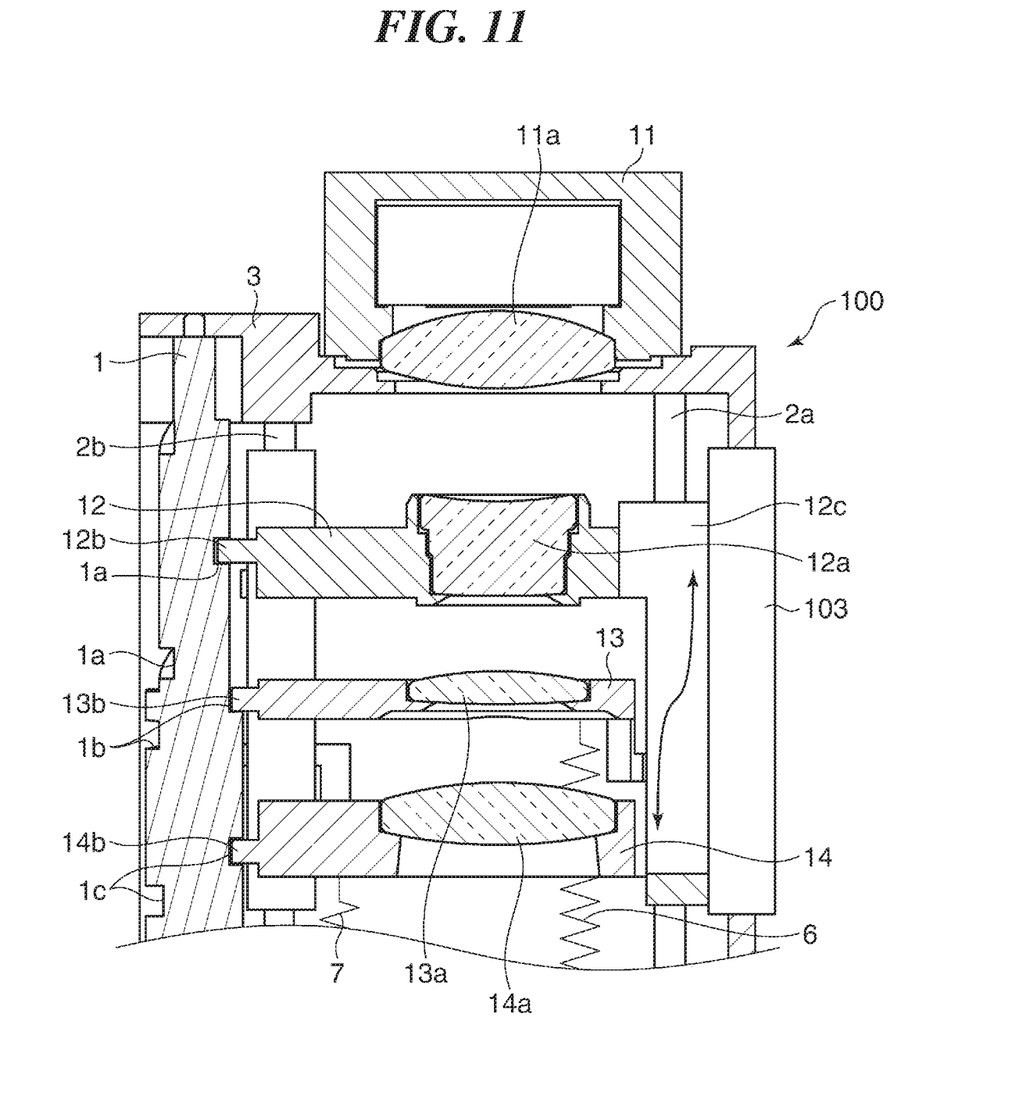
FIG. 11 is a cross-sectional view schematically showing a cross section, along direction of an optical axis, of a lens barrel which is a third embodiment of the present invention, at a location of a camshaft when the lens barrel is at a predetermined zoom position, the cross section being shown with some parts of the lens barrel omitted.

FIG. 11 is a cross-sectional view schematically showing a cross section, along direction of an optical axis, of the lens barrel at a location of the camshaft 1 when the lens barrel is at a predetermined zoom position, the cross section being shown with some parts of the lens barrel omitted. FIG. 12 is a graph showing a positional relationship among a second optical unit 12, a third optical unit 13, and a fourth optional unit 14 in a direction of the optical axis from a wide-angle position to a telephoto position.

As shown in FIG. 11, the power transmission mechanism 100 has the linear actuator 103. A first optical unit 11 holds a first lens group 11a and is fixed to the housing case 3. The first lens group 11a has two lenses provided perpendicularly to each other, and a prism (not shown) is provided between the two lenses. It should be noted that in the present embodiment, the first optical unit 11 is a fixed optical group, but may be a moving optical group. The prism should not necessarily be included in the first lens group 11a, but may be provided in a lens group of another optical unit on an image plane side.

The second optical unit 12, which holds a second lens group 12a, is movably supported in the direction of the optical axis by being fitted in and held by a guide bar 2b and being engaged with and held by a guide bar 2a. The second optical unit 12 has, on an outer periphery thereof, a first follower 12b which engages with a first cam portion 1a provided on the camshaft 1, and a contact portion 12c which is provided between the second optical unit 12 and the linear actuator 103. With the contact portion 12c coming into contact with the linear actuator 103, the second optical unit 12 is subjected to thrust in the direction of the optical axis from the linear actuator 103.

The third optical unit 13 holds a third lens group 13a and is held by the guide bars 2a and 2b movably in the direction of the optical axis. The third optical unit 13 has a second follower 13b which engages with a second cam portion 1b provided in the camshaft 1.

The third optical unit 13 is urged in the direction of the optical axis by a third spring member 6 provided as an urging member. The fourth optical unit 14 holds a fourth lens group 14a and is held by the guide bars 2a and 2b movably in the direction of the optical axis. The fourth optical unit 14 has a third follower 14b which engages with a third cam portion 1c provided in the camshaft 1. The fourth optical unit 14 is urged in the direction of the optical axis by a fourth spring member 7 provided as an urging member.

With rotation of the camshaft 1, a cam action of the second cam portion 1b and the second follower 13b, and a cam action of the third cam portion 1c and the third follower 14b cause the third optical unit 13 and the fourth optical unit 14 to move in the direction of the optical axis.

With the arrangement described above, the second optical unit 12 is subjected to thrust from the linear actuator 103 via the contact portion 12c and moves in the direction of the optical axis according to a zoom position. The first follower 12b of the second optical unit 12 is engaged with the first cam portion 1a of the camshaft 1. For this reason, as the second optical unit 12 moves in the direction of the optical axis, a cam action of the first cam portion 1a and the first follower 12b causes the camshaft 1 to rotate.

The second follower 13b of the third optical unit 13 is engaged with the second cam portion 1b of the camshaft 1, and the third follower 14b of the fourth optical unit 14 is engaged with the third cam portion 1c of the camshaft 1. For this reason, as described earlier, with rotation of the camshaft 1, the cam action of the second cam portion 1b and the second follower 13b and the cam action of the third cam portion 1c and the third follower 14b cause the third optical unit 13 and the fourth optical unit 14 to move in the direction of the optical axis and as a result, the lens barrel performs a zooming operation. It should be noted that in the present embodiment, the camshaft 1 may have a diameter equal to, larger, or smaller than that of the third optical unit 13 and that of the fourth optical unit 14.

Figure 12:
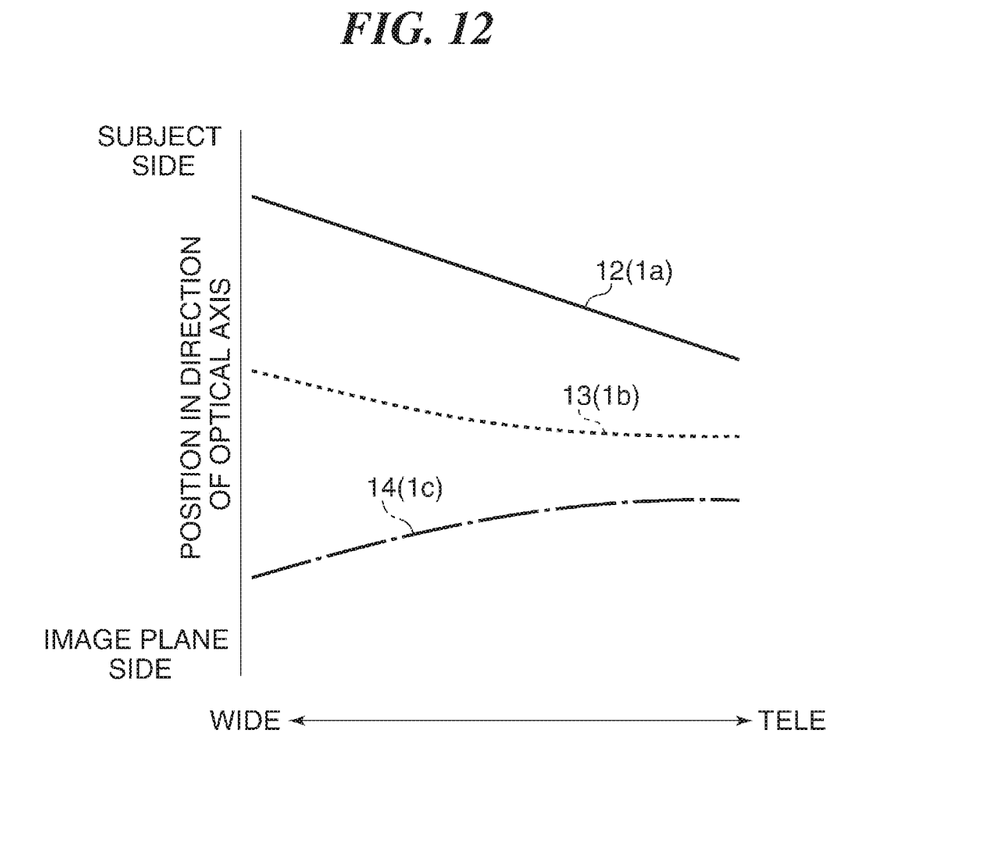
FIG. 12 is a graph showing a positional relationship among a second optical unit, a third optical unit, and a fourth optical unit in a direction of the optical axis from a wide-angle position to a telephoto position.

As is apparent from FIG. 12, the second optical unit 12 moves substantially linearly from the wide-angle position toward the telephoto position. For this reason, by actuating the second optical unit 12 in one direction with the linear actuator 103, the camshaft 1 engaged with the second optical unit 12 is rotated in a stable manner.

For example, the third optical unit 13 moves from the wide-angle position to the telephoto position while drawing a gentle curve toward the image plane side. When the third optical unit 13 which takes such a moving path is actuated by the linear actuator 103, there may be a position, at which an inclination angle, with respect to the optical axis, of the second cam portion 1b of the camshaft 1 cam-engaged with the third optical unit 13, is gentle, and this is not preferable. Meanwhile, it is preferable that the second optical unit 12 which moves in one direction and takes a substantially linear movement path is moved in the direction of the optical axis by the linear actuator 103, which enables the camshaft 1 to rotate in a stable manner.

Moreover, it is preferred that among the cam portions 1a to 1c provided in the camshaft 1, the first cam portion 1a engaged with the second optical unit 12 actuated by the linear actuator 103 has the steepest inclination angle with respect to the optical axis. This is because that the steeper the inclination angle with respect to the optical axis the cam portion for rotating the camshaft 1 has, the smaller thrust is required to rotate the camshaft 1.

Furthermore, the gentler inclination angle of the cam portions 1a and 1c of the camshaft 1 with respect to the optical axis, the smaller rotational force of the camshaft 1, which is required to move the third optical unit 13 and the fourth optical unit 14 in the direction of the optical axis, can be kept. By thus keeping the rotational force of the camshaft 1 small, it is possible to reduce the thrust of the linear actuator 103.

As described above, when the power transmission mechanism 100 is comprised of the linear actuator 103, a remaining torque is generated in the camshaft 1 due to the third optical unit 13 and the fourth optical unit 14 being urged by the third spring member 6 and the fourth spring member 7, respectively. As in the first embodiment described above, this remaining torque can be reduced by adjusting the urging forces of the third spring member 6 and the fourth spring member 7. The remaining torque is also adjusted by using the torque adjustment member 20 of the second embodiment described above. Other arrangements and operational advantages are the same as those in the first embodiment and second embodiment described above.

It should be noted that the present invention is not limited to the illustrative embodiments described above, and materials, shapes, dimensions, forms, numbers, location for arrangement, and so on can be appropriately changed as long as the concept of the present invention is not deviated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-209540, filed Oct. 26, 2016 which is hereby incorporated by reference herein in its entirety.

What is claimed is:
1. A lens barrel comprising:
a first optical unit configured to move in a direction of an optical axis;
a second optical unit configured to move in the direction of the optical axis;

an urging member configured to urge the first optical unit and the second optical unit in the direction of the optical axis;

a cam member provided on outer peripheries of the first optical unit and the second optical unit, the cam member being cam-engaged with each of the first optical unit and the second optical unit; and a power transmission mechanism configured to transmit driving force, which is for rotating the cam member, to the cam member, wherein the cam member extends in the direction of the optical axis, wherein a radius of the cam member is smaller than a radius of the first optical unit and a radius of the second optical unit, wherein a rotating axis of the cam member is provided outside of outer peripheries of the first optical unit and the second optical unit, and wherein a first torque generated in the cam member by the urging member urging the first optical unit and a second torque generated in the cam member by the urging member urging the second optical unit are opposite in direction.

2. The lens barrel according to claim 1, wherein the first torque and the second torque are opposite in direction over a whole area between a wide-angle position and a telephoto position.

3. The lens barrel according to claim 1, wherein the urging member includes a first urging member and a second urging member that generate different urging forces, and at an arbitrary zoom position between the wide-angle position and the telephoto position, the first urging member and the second urging member generate the first torque and the second torque, which are opposite in direction and have the same magnitude, in the cam member by urging forces of the first urging member and the second urging member.

4. The lens barrel according to claim 1, wherein a remaining torque that is a difference between the first torque and the second torque generated by the urging forces of the urging members are in the same direction over a whole range between the wide-angle position and the telephoto position.

5. The lens barrel according to claim 1, wherein the first optical unit and the second optical unit are respectively cam-engaged with cam grooves provided in the cam member, and out of the cam groove with which the first optical unit is cam-engaged and the cam groove with which the second optical unit is cam-engaged, the cam groove having a smaller inclination angle is located at a longer distance from a center of an axis of the cam member.

6. An image pickup apparatus with a lens barrel, the lens barrel comprising:

a first optical unit configured to move in a direction of an optical axis;

a second optical unit configured to move in the direction of the optical axis;

an urging member configured to urge the first optical unit and the second optical unit in the direction of the optical axis;

a cam member provided on outer peripheries of the first optical unit and the second optical unit, the cam member being cam-engaged with each of the first optical unit and the second optical unit; and a power transmission mechanism configured to transmit driving force, which is for rotating the cam member, to the cam member, wherein the cam member extends in the direction of the optical axis, wherein a radius of the cam member extends in the direction of the optical axis, wherein a rotating axis of the cam member is provided outside of outer peripheries of the first optical unit and the second optical unit, and wherein a first torque generated in the cam member by the urging member urging the first optical unit and a second torque generated in the cam member by the urging member urging the second optical unit are opposite in direction.

* * * * *